United States Patent
Johnson et al.

[11] Patent Number: 6,143,263
[45] Date of Patent: Nov. 7, 2000

[54] METHOD AND SYSTEM FOR SO₂ AND SO₃ CONTROL BY DRY SORBENT/REAGENT INJECTION AND WET SCRUBBING

[75] Inventors: Dennis Wayne Johnson, Barberton; Pervaje Ananda Bhat, Lake Township; Thomas Robert Goots, North Canton, all of Ohio

[73] Assignee: The Babcock & Wilcox Company, New Orleans, La.

[21] Appl. No.: 08/235,597

[22] Filed: Apr. 29, 1994

[51] Int. Cl.⁷ .................................................. B01D 53/50
[52] U.S. Cl. .......................... 423/242.1; 423/243.01; 423/243.08; 423/244.01; 423/244.07
[58] Field of Search .......................... 423/242.1, 243.01, 423/243.08, 244.01, 244.07

[56] References Cited

U.S. PATENT DOCUMENTS

| 4,540,555 | 9/1985 | Franke et al. | 423/242 |
| 4,555,391 | 11/1985 | Cyran et al. | 423/244 |
| 4,696,804 | 9/1987 | Shinoda et al. | 423/242 |
| 5,002,743 | 3/1991 | Kokkonen et al. | 423/244 |
| 5,084,256 | 1/1992 | McElroy et al. | 423/244 |

FOREIGN PATENT DOCUMENTS

| 4-94720 | 3/1992 | Japan | 423/244.07 |
| 4141214 | 5/1992 | Japan | 423/244.01 |
| 1 589 999 | 5/1981 | United Kingdom | B01D 53/34 |
| 9011817 | 10/1990 | WIPO . | |

OTHER PUBLICATIONS

"Gas Purification" by Kohl et al. 4th. ed. Gulf Publishing Co. Houston TX (1985) pp. 302–303 & 306–320.

Peterson, J.R.; Maller, G.; Burnette, A. (Radian Corp., Austin, TX); and Rhudy, R.G. (Electric Power Research Institute, Palo Alto, CA). "Pilot–Scale Evaluation of Sorbent Injection to Remove SO₃ and HCI", EPRI Research Project No. 2250–3, believed contained in "Proceedings: 1991 SO₂ Control Symposium". Presented at 1991 SO₂ Control symposium in Washington, DC on Dec. 2–3, 1991. Dated Nov. 1992. pp. 6A.1 to 6A.23.

(List continued on next page.)

*Primary Examiner*—Tom Dunn
*Assistant Examiner*—Timothy C Vanoy
*Attorney, Agent, or Firm*—R. J. Edwards; Eric Marich; Robert C. Baraona

[57] ABSTRACT

A method and system for removing SO₃ and SO₂ a flue gas produced by the burning of a fossil fuel. Particulates are removed from the flue gas to produce partially cleaned flue gas. A sufficient amount of calcium-based, sodium based or magnesium-based dry sorbent, preferably having a particle size larger than 1.0–2.0 microns, is injected into the flue gas to react with and remove substantially all of the SO₃ from the partially cleaned flue gas to produce a substantially SO₃-free flue gas containing reacted and unreacted dry sorbent. The substantially SO₃-free flue gas is conveyed to wet scrubber means for removing SO₂ to produce cleaned flue gas. In a first embodiment, sufficient dry sorbent is provided to remove desired amounts of SO₃ and SO₂. In a second embodiment, a make-up reagent provided to the wet scrubber means wets the dry sorbent, removes both the reacted and unreacted dry sorbent from the substantially SO₃-free flue gas, and makes the unreacted dry sorbent available as a reagent for SO₂ removal, the make-up reagent and the unreacted dry sorbent reacting with and removing the SO₂ from the substantially SO₃-free flue gas to produce cleaned flue gas.

6 Claims, 1 Drawing Sheet

OTHER PUBLICATIONS

DeVito, M.S. and Smith, D.L. (Consolidation Coal Co.). Entitled "Controlled condensation method: New option for $SO_3$ sampling", *Power*, Feb. 1991. pp. 41 to 44.

Bhat, P.A.; Johnson, D.W. (The Babcock & Wilcox Company) and Cushing, K.M. (Southern Research Institute). Paper entiled "Results of Particulate and Gascous Sampling from a Wet Scrubber Pilot Plant ". Presentation to Tenth Particulate Control Symposium in Washington, DC on Apr. 5–8, 1993. Entire paper.

Goots, T.R.; DePero, M.J.; Nolan, P.S. (The Babcock & Wilcox Company). Entitled "LMB Demonstration Project Extension and Coolside Demonstration". Prepared for U.S. Department of Energy Office of Fossil Energy. Oct. 1992. Entire paper.

*The McIlvaine Scrubber Manual*, ©1974, The McIlvaine Co. pp. 169.5, 169.6 and 169.61–169.66.

Air Pollution Engineering Manual Edited by Buonicore et al, ©1972, Van Nostrand Reinhold. pp. 76 and 226.

METHOD AND SYSTEM FOR $SO_2$ AND $SO_3$ CONTROL BY DRY SORBENT/REAGENT INJECTION AND WET SCRUBBING

FIELD AND BACKGROUND OF THE INVENTION

The present invention relates, in general, to the removal of particulates and other contaminants from flue gas produced by the burning of a fossil fuel and, in particular, to a new and useful method and system which simultaneously removes sulfur trioxide ($SO_3$) from the flue gas by injecting dry sorbent downstream of a particulate collection device, capturing reacted and unreacted dry sorbent in a wet scrubber, and removing sulfur dioxide ($SO_2$) in the wet scrubber.

In the pollution control field, several approaches are used to remove sulfur oxides and other contaminants from a flue gas produced by the burning of a fossil fuel in order to comply with Federal and State emissions requirements. One approach involves locating and utilizing fossil fuels lower in sulfur content and/or other contaminants. A second approach involves removing or reducing the sulfur content and/or other contaminants in the fuel, prior to combustion, via mechanical and/or chemical processes. A major disadvantage to the second approach is the limited cost effectiveness of the mechanical and/or chemical processing required to achieve the mandated reduction levels of sulfur oxides and/or other contaminants.

By and large, the most widely used approaches to removing sulfur oxides and/or other contaminants from flue gas involves post-combustion clean-up of the flue gas. Several methods have been developed to remove the $SO_2$ species from flue gases.

A first method for removing $SO_2$ from flue gas involves either mixing dry alkali material with the fuel prior to combustion, or injection of pulverized alkali material directly into the hot combustion gases to remove sulfur oxides and other contaminants via absorption or absorption followed by oxidation. Major disadvantages of this first method include: fouling of heat transfer surfaces (which then requires more frequent soot blowing of these heat transfer surfaces), low to moderate removal efficiencies, poor reagent utilization, and increased particulate loadings in the combustion gases which may require additional conditioning (i.e. humidification or sulfur trioxide injection) of the gas if an electrostatic precipitator is used for downstream particulate collection.

A second method for removing $SO_2$ from flue gas, collectively referred to as wet chemical absorption processes and also known as wet scrubbing, involves "washing" the hot flue gases with an aqueous alkaline solution or slurry in an upflow, gas-liquid contact device to remove sulfur oxides and other contaminants. Major disadvantages associated with these wet scrubbing processes include: the loss of liquid both to the atmosphere (i.e., due to saturation of the flue gas and mist carry-over) and to the sludge produced in the process, and the economics associated with the construction materials for the absorber module itself and all related auxiliary downstream equipment (i.e., primary/secondary dewatering and waste water treatment subsystems).

A third method, collectively referred to as spray drying chemical absorption processes and also known as dry scrubbing, involves spraying an aqueous alkaline solution or slurry which has been finely atomized via mechanical, dual-fluid or rotary cup-type atomizers, into the hot flue gases to remove sulfur oxides and other contaminants. Major disadvantages associated with these dry scrubbing processes include: moderate to high gas-side pressure drop across the spray dryer gas inlet distribution device, and limitations on the spray down temperature ( i.e., the approach to flue gas saturation temperature) required to maintain controlled operations.

Several methods have been developed to remove $SO_3$ from flue gas. One method is known as dry sorbent injection, which involves injecting a sorbent (generally lime, limestone, promoted lime, sodium bicarbonate or other alkali sodium salts, or other alkali metal salts such as silica, aluminum, iron, etc.) into the flue gas at temperatures above the adiabatic saturation temperature of the flue gas. The amount of sorbent required is highly dependent upon the sorbent properties (i.e., the composition, particle size, surface area, etc.), flue gas temperature, and method of injecting.

Spray drying chemical absorption processes, such as described above in connection with $SO_2$ removal, are also used for $SO_3$ control.

Wet precipitators have also been used to remove $SO_3$ from wet flue gas streams. In these systems, the $SO_3$ forms an aerosol of $H_2SO_4$ by reaction with water. The aerosol behaves much like a solid particle in that it is removed when an electrical charge is applied. The aerosol is then collected by impaction on wetted plates or tubes for removal from the flue gas stream.

$SO_3$ can also be removed via condensation. One known process is the WSA-SNOX process in which $SO_2$ is catalytically converted to $SO_3$. The $SO_3$ is then removed by condensation, forming a dilute sulfuric acid. Other known methods for $SO_3$ removal include activated carbon, and packed, moving, or fluidized bed processes. Also, combined processes which utilize a hot catalytic baghouse are known to remove $SO_3$. Moreover, $SO_3$ can also be removed by adding a sorbent or reagent such as MgO to the fuel.

One known system for removing $SO_3$ from flue gas produced by a combustion process is schematically illustrated in FIG. 1. A fossil fuel 2, such as coal, is burned in a boiler 4 and the resulting flue gas 6 is passed through a heat exchanger 8 to cool the gas. $SO_3$ from the flue gas 6 is removed in a dry scrubber 10 by contacting the flue gas 6 with an atomized reagent slurry 12 in an evaporating mode. The reagent slurry 12 used in the dry scrubber 10 is provided by a reagent preparation system 14. After dry scrubbing, the partially cleaned but particle-laden flue gas 16 is channeled to a particulate collector 18, such as a baghouse or precipitator, to remove particles from the flue gas 16. After particles are removed from the flue gas 16, the cleaned flue gas 20 exits the system through a stack 22. Reaction product 24, and collected particles and other material 26 collected in the dry scrubber 10 and particulate collector 18 are then channeled to a waste disposal device 28, while any reusable reagent from the reaction product 24 is provided back into the reagent preparation system 14. Dry scrubber systems such as shown in FIG. I have high operating costs due to both the power requirements to atomize the reagent slurry and the cost of the reagent itself. In addition, reagent utilization is poor compared to other systems such as wet scrubber systems.

FIG. 2 schematically illustrates another known system for removing $SO_3$ from flue gas produced by the combustion of a fossil fuel. In this system, a dry injection process injects a sorbent 30 at one or more of a plurality of locations in the system. A first location 32 involves injection of the sorbent 30 directly along with the fuel 2. A second location 34 involves injection of the sorbent into the boiler 4 so that it mixes with the flue gas 6 at a location downstream of the fuel 2 injection point. A third location 36 involves injection of the sorbent 30 into the flue gas 6 just upstream or prior to its entry into the heat exchanger 8, while a fourth location 38 involves injection of the sorbent 30 into the flue gas after it exits the heat exchanger 8. The sorbent 30 is provided by a sorbent receiving and preparation station 40, while the collected particles and other materials 42 are collected in a waste disposal device 44. These dry injection processes, similar to dry scrubbers, typically require high cost reagents and are known to have poor reagent utilization, resulting in increased operating costs and quantities of waste product. Additionally, the presence of unused reagent in the waste product limits its the use as a product and detrimentally affects the properties of the waste, which impacts landfill operations. Finally, since both the reaction products and unused sorbent are captured in the particulate collector 18, the unused sorbent is not readily available for use in $SO_2$ removal.

The known systems illustrated in FIGS. 1 and 2 remove $SO_3$ from the flue gas prior to removal of particulates from the flue gas in the particulate collector 18. In some cases, these sulfur oxide removal processes significantly affect the performance of the particulate collector 18 due to the increased particulate loading which occurs when the reaction product is provided to the particulate collector 18. If the particulate collector 18 is an electrostatic precipitator, there is also a great chance of changing the resistivity of the particles which affects the collection efficiency.

It is well-known in the pollution control field that a wet scrubber does not effectively remove $SO_3$ from flue gas. In wet scrubber systems, the rapid quenching of the flue gas that occurs when the hot gas is contacted with water or an aqueous stream results in formation of aerosol $H_2SO_4$. These very fine droplets of $H_2SO_4$ tend to pass on through the wet scrubber without being removed from the flue gas. Recent tests conducted on a wet scrubber pilot plant receiving hot flue gas from a coal fired boiler plant indicated that only 25–35% of the $SO_3$ in the flue gas at the inlet to the wet scrubber was removed for inlet $SO_3$ concentrations of 9 to 25 ppm. Although $SO_3$ typically comprises only a small portion of the sulfur oxides in the flue gas produced in such combustion processes, even small excess amounts of $SO_3$ in the flue gas emitted from the stack at such a plant can result in a visible plume which may cause the plant to exceed regulatory requirements for opacity or $SO_3$ emissions.

Other known systems for $SO_3$ removal from flue gas require additional equipment, are very complicated in design and operation, and provide a very costly method for removing $SO_2$ and $SO_3$. It is thus apparent that a simple and economical method and system is still needed to remove both $SO_2$ and $SO_3$ from the flue gas produced by the burning of a fossil fuel that overcomes the disadvantages of these prior approaches.

SUMMARY OF THE INVENTION

The present invention pertains to a method and system for removing $SO_2$ and $SO_3$ from a flue gas by injecting dry sorbent into the flue gas downstream of a particulate collection device, capturing reacted and unreacted dry sorbent in a wet scrubber, and removing sulfur dioxide ($SO_2$) in the wet scrubber.

More particularly, one aspect of the present invention is drawn to a method for removing $SO_3$ and $SO_2$ from a flue gas produced by the burning of a fossil fuel to produce cleaned flue gas. The steps of the method comprise: providing flue gas to particulate collection means for collecting particles from the flue gas to produce partially cleaned flue gas, and conveying the partially cleaned flue gas from the particulate collection means after particles have been removed from the flue gas; injecting into the flue gas, after particles have been removed therefrom, an amount of dry sorbent sufficient to react with and remove substantially all of the $SO_3$ from the partially cleaned flue gas to produce a substantially $SO_3$-free flue gas containing reacted dry sorbent and unreacted dry sorbent; conveying the substantially $SO_3$-free flue gas, reacted dry sorbent, and unreacted dry sorbent to wet scrubber means; providing a primary reagent to the wet scrubber means to remove $SO_2$ from the flue gas and also to wet the dry sorbent in the substantially $SO_3$-free flue gas, thereby removing both the reacted and unreacted dry sorbent from the substantially $SO_3$-free flue gas and also making the unreacted dry sorbent available as a reagent for $SO_2$ removal; and reacting the primary reagent and unreacted dry sorbent with the $SO_2$ to remove the $SO_2$ from the substantially $SO_3$-free flue gas to produce cleaned flue gas.

Another aspect of the present invention is drawn to a system for accomplishing the above method.

The dry sorbent can be any type of reagent including a calcium-based reagent, a sodium-based reagent, or a magnesium-based reagent. Additionally, the particle size of the dry sorbent is larger than 1.0 microns in size, and preferably, larger than 2.0 microns in size, in order for the particles to be effectively collected in the wet scrubber means and removed from the flue gas.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which a preferred embodiment of the invention is illustrated.

DESCRIPTION OF THE PREFERRED EMBODIMENTS

The present invention takes into account the fact that $SO_3$ removal by dry injection is dependent on parameters such as particle size or surface area, quantity of sorbent injected, injection method, sorbent type, and the temperature of the flue gas in the vicinity of the injection point.

Figure 1:
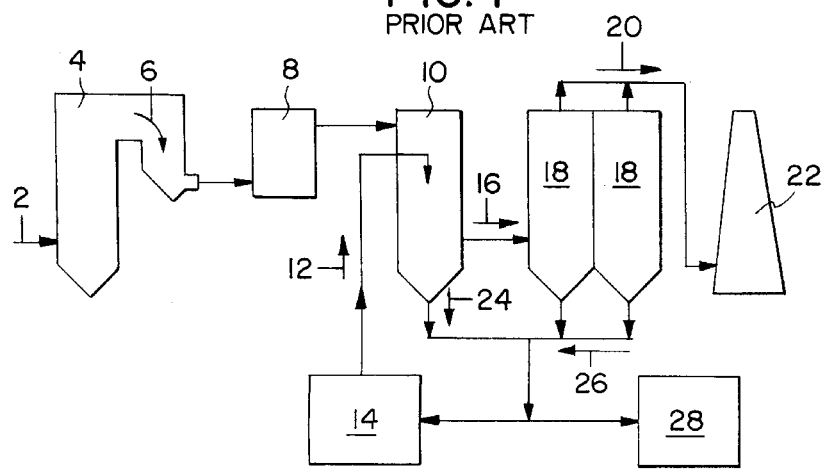
FIG. 1 is a schematic view illustrating one known system for removing $SO_3$ from a flue gas.
Figure 2:
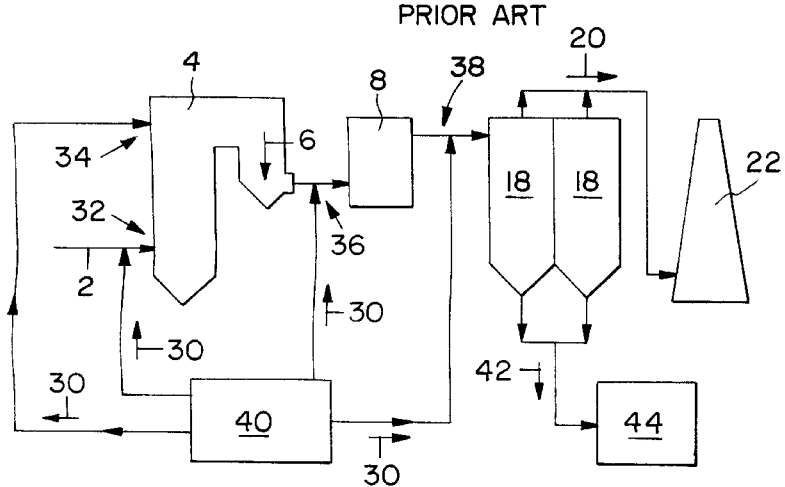
FIG. 2 is a schematic view illustrating a second known system for removing $SO_3$ from a flue gas.
Figure 3:
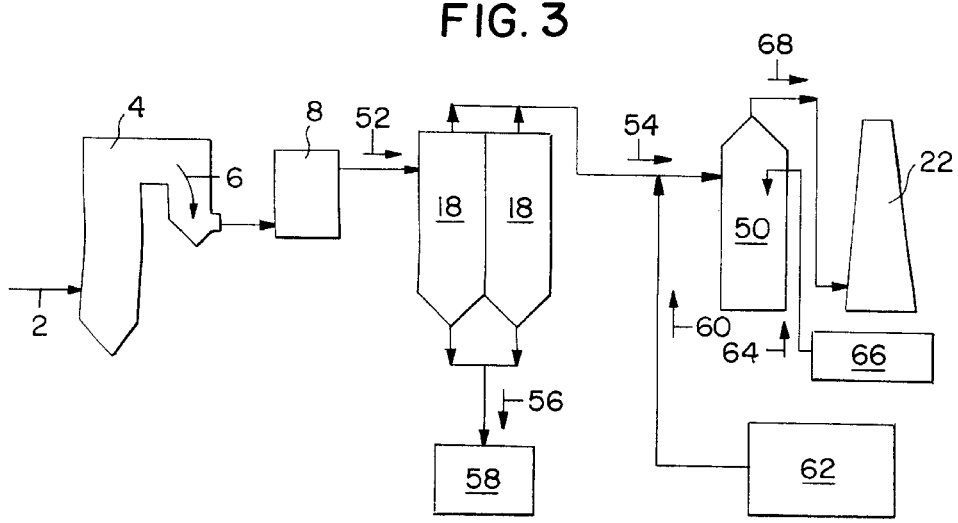
FIG. 3 is a schematic view illustrating a system for removing $SO_3$ from a flue gas according to the present invention.

As schematically shown in FIG. 3, one aspect of the present invention provides a system and method for removing $SO_3$ and $SO_2$ from flue gas utilizing a wet scrubber 50 located downstream of the particulate collector 18, such as a baghouse or electrostatic precipitator. For illustration purposes, the same reference numerals are used to designate the same or similar parts or features used by the known systems and methods.

Flue gas 6 from the boiler 4 is passed through a heat exchanger 8. to provide cooled flue gas 52 which is then conveyed to particulate collector 18 to remove particles from the flue gas 52 prior to any subsequent processing of the flue gas to remove $SO_2$ and/or $SO_3$. Partially cleaned flue gas 54 thus leaves the particulate collector 18 and is conveyed towards wet scrubber 50. Particles 56 removed from the flue gas 52 are sent to a waste disposal device 58 for disposal. Before the flue gas 54 is provided to the wet scrubber 50, however, a dry sorbent 60, such as a calcium-based reagent, a sodium-based reagent or a magnesiumbased reagent, is injected into the flue gas 54 by any known means. The dry sorbent 60 can comprise any of the following: lime, limestone, promoted lime, sodium bicarbonate or other alkali sodium salts, or other alkali metal salts such as silica, aluminum, iron, sodium, potassium, calcium, magnesium, etc. and other alkali compounds such as ammonium based compounds or mixtures of such compounds with each other or with inert or catalyzing agents. The dry sorbent 60 is provided from a sorbent preparation and receiving station 62. The dry sorbent 60 reacts with the $SO_3$ in the flue gas 54 causing most of the $SO_3$ to be removed from the flue gas 54, thereby producing a substantially $SO_3$-free flue gas. A sufficient amount of dry sorbent 60 is injected into the flue gas 54 upstream of the wet scrubber 50 such that a portion of the dry sorbent 60 remains or is unreacted after most of the $SO_3$ has been absorbed, thereby producing the substantially $SO_3$-free flue gas containing reacted dry sorbent and unreacted dry sorbent.

After the dry sorbent 60 is injected into the flue gas 54, the reacted dry sorbent and the remaining or unreacted portion of dry sorbent 60 is conveyed to the wet scrubber 50. In the wet scrubber 50, the dry sorbent 60 is wetted, thereby making the unreacted dry sorbent available as a reagent for $SO_2$ removal. The wet scrubber 50 wets and removes the reacted and unreacted dry sorbent 60 from the flue gas, ensuring that the unreacted dry sorbent 60 is available to absorb $SO_2$ from the flue gas within the wet scrubber 50.

Make-up reagent 64, if necessary, is also provided to the wet scrubber 50 from optional reagent preparation station 66. Optional reagent preparation station 66 would not be required for situations when unreacted dry sorbent 60 and make-up reagent 64 are the same compound, or when all reagent for $SO_2$ removal is provided as an excess amount of unreacted dry sorbent injected into the flue gas 54. In the latter case, the amount of dry sorbent 60 injected into the flue gas 54 would be sufficient to not only take care of the $SO_3$ in the flue gas 54, but also to provide sufficient reagent such that, once it is wetted and available in the downstream wet scrubber, the desired amount of $SO_2$ is removed from the flue gas. In this latter case, the wet scrubber 50 would thus serve to provide a region where a liquid, typically water, would be sprayed into the flue gas to wet and remove the dry sorbent from the flue gas. The mixture of water and dry sorbent collected at the bottom of the wet scrubber 50 would thus become a slurry that is reinjected back into the flue gas.

It should be noted that it is not necessary for the dry sorbent 60 and the make-up reagent 64 for $SO_2$ removal in the wet scrubber 50 to be the same compound. For example, the dry sorbent 60 could comprise hydrated lime while limestone ($CaCO_3$) was used as the make-up reagent 64 in the wet scrubber 50. After removing the $SO_2$ from the flue gas within the wet scrubber 50, substantially clean flue gas 68 exits from the system through stack 22. It will be appreciated by those skilled in the art that the substantially clean flue gas 68 exiting through the stack 22 will have some amount of $SO_2$ therein, the amount depending upon the system design and any required guarantees. Typical $SO_2$ removal efficiencies required in industry for wet scrubber systems range from 90% to 98%. Other combinations of compounds for dry sorbent 60 and make-up reagent 64 could also be used.

For achieving 90% $SO_3$ removal, using a calcium-based reagent (such as hydrated lime —$Ca(OH)_2$), the $Ca/SO_3$ molar feed ratio ranges from about 2.0 at high temperatures, i.e. about 2,000° F., to 10.0 at intermediate temperatures, i.e. about 700° F., to about 20.0 at low temperatures, i.e. 315° F. Typically, about 0.3–1.5% of the sulfur is converted to $SO_3$ in the combustion of fossil fuels. Some of the $SO_3$ is removed with fly ash or on surfaces in the flue gas train. Therefore, a typical concentration of $SO_3$ for a pollution control device may be 0–25 ppm with a high condition or 50 to 100 ppm in severe conditions or oil fired conditions. Even at a $Ca/SO_3$ molar ratio of 20, for example, the amount of reagent required to remove 90% of the $SO_3$ is substantially less than that required to remove the $SO_2$. This result is illustrated below as follows:

Basis: 100 moles sulfur

Result: 99 moles $SO_2 \times 1$ mole Ca/mole $SO_2$=99 moles Ca
1 mole $SO_3 \times 20$ moles Ca/mole $SO_3$=20 moles Ca.

In this example, 100 moles of sulfur is converted to 99 moles of $SO_2$ and 1 mole of $SO_3$. Using a conversion of 1 mole Ca per mole $SO_2$, which a wet scrubber approaches, the 99 moles of Ca is required. However, it requires 20 moles of Ca to remove 1 mole of $SO_3$ at low temperature though only 1 mole of Ca is actually reacted. Therefore, referring to FIG. 3, if 20 moles of sorbent is injected to remove $SO_3$, the 19 moles of unreacted sorbent is still available for use to react with the $SO_2$ in the wet scrubber 50. Moreover, 100 moles of Ca can be injected to remove substantially all of the $SO_3$. Then, the 99 moles of unreacted sorbent are captured by the wet scrubber 50 and available to react with $SO_2$.

Recent tests have confirmed that wet scrubbers are effective means of particulate control, especially for particles greater than 1–2 microns in size. Particle sizes for sorbents such as Calcitic hydrated lime, ligno sulfonated lime, type-N dolomitic hydrated lime, and pulverized limestone used in sorbent injection tests has a range of particle sizes such that 10% or more is less than 2.0 microns. Since the wet scrubber will not effectively remove particles of this size, the sorbent used in the present invention is preferentially a size larger than 1–2 microns. This is obtained by screening or other mechanical separation of the fine fraction. Since the $SO_3$ removal is somewhat dependent on this fine fraction, the amount injected is increased to compensate for the resultant decrease in surface area per unit mass of the coarser sorbent.

Advantages of the system and method according to the present invention include: combined removal of $SO_2$ and $SO_3$ in one system; reagent utilization which is high such as that achieved by conventional wet scrubbers; a portion or all of the reagent required by the process is injected to maximize $SO_3$ removal and to be available for $SO_2$ removal in the wet scrubber; no detrimental effects on particulate removal devices as sorbent injection is accomplished downstream of the particulate collector; no increase in the amount of waste created over known systems; a wide variety of reagents utilized including sodium, magnesium, and calcium based reagents; no detrimental effects on the wet scrubber so that almost any wet scrubber technology can be used; removal of HCl and other acid gases as well as $SO_2$ and $SO_3$; reduction in stack plume and opacity by $SO_3$ and fine particulate removal with less equipment than other systems which provides lower operating cost; for calcium based reagents or sorbent, $SO_3$ reacts to form gypsum ($CaSO_4$), which may increase particle size of the sorbent injected into the gas stream for easier removal in the wet scrubber; the gypsum may be available as a seed crystal in the process; only one sorbent preparation/handling system is required for systems using the same sorbent for both $SO_2$ and $SO_3$ removal so that if limestone is used, dry milling, such as already used on some wet scrubbers, would be employed; and sorbent injected downstream of particulate collection minimizes the loss of valuable reagent.

While specific embodiments of the invention have been shown and described in detail to illustrate the application of the principles of the invention, it will be understood that the invention may be embodied otherwise without departing from such principles.

We claim:

1. A method for removing $SO_3$ and $SO_2$ from a flue gas produced by the burning of a fossil fuel, comprising:

providing flue gas to particulate collection means for collecting particles from the flue gas to produce partially cleaned flue gas;

injecting into the partially cleaned flue gas, after particles have been removed therefrom by the particulate collection means, an amount of dry sorbent having a particle size range larger than approximately 1.0 microns sufficient to react with and remove substantially all of the $SO_3$ from the partially cleaned flue gas to produce a substantially $SO_3$-free flue gas containing reacted dry sorbent and unreacted dry sorbent;

conveying the substantially $SO_3$-free flue gas, reacted dry sorbent, and unreacted dry sorbent to wet scrubber means to wet and remove both the reacted and unreacted dry sorbent in the substantially $SO_3$-free flue gas, thereby making the unreacted dry sorbent available as a wet reagent for $SO_2$ removal; and reacting the wet reagent with the $SO_2$ in the wet scrubber means to remove $SO_2$ from the substantially $SO_3$-free flue gas conveyed to the wet scrubber means.

2. The method according to claim 1, comprising the step of injecting an amount of dry sorbent into the flue gas sufficient to produce a substantially $SO_3$-free flue gas containing reacted dry sorbent, and an amount of unreacted dry sorbent that, once wetted in the wet scrubber means and made available as a wet reagent for $SO_2$ removal, is sufficient to react with and remove enough of the $SO_2$ from the substantially $SO_3$-free flue gas conveyed to the wet scrubber means to produce substantially clean flue gas.

3. The method according to claim 1, wherein the dry sorbent is a member selected from the group consisting of sodium-based reagents, calcium-based reagents, and magnesium-based reagents.

4. The method according to claim 1, comprising the step of providing an amount of make-up reagent to the wet scrubber means such that there is a sufficient amount of unreacted dry sorbent and make-up reagent to react with and remove enough of the $SO_2$ from the substantially $SO_3$-free flue gas conveyed to the wet scrubber means to produce substantially clean flue gas.

5. The method according to claim 4, wherein the dry sorbent and the make-up reagent are made from the same chemical compound.

6. The method according to claim 4, wherein the dry sorbent and the make-up reagent are made from different chemical compounds.

* * * * *